United States Patent [19]

Raabe et al.

[11] 3,883,485

[45] May 13, 1975

[54] COPOLYAMIDES CONTAINING CAPROLACTAM, LAURICLACTAM AND HEXAMETHYLENE DIAMINE ADIPATE

[75] Inventors: Fritz Raabe, Bonn; Eduard de Jong, Bonn-Beuel, both of Germany

[73] Assignee: Plate Bonn Gesellschaft mit beschrankter Haftung, Bonn, Germany

[22] Filed: July 31, 1973

[21] Appl. No.: 384,370

[30] Foreign Application Priority Data

May 12, 1973  Germany............................ 2324159

[52] U.S. Cl. ........... 260/78 L; 117/161 P; 156/283; 156/307; 156/331; 161/227; 260/33.4 R; 260/78 A; 260/78 S
[51] Int. Cl............................................. C08g 20/10
[58] Field of Search ......................... 260/78 L, 78 A

[56] References Cited
UNITED STATES PATENTS

| | | | |
|---|---|---|---|
| 2,252,554 | 8/1941 | Carothers .......................... | 260/78 A |
| 3,037,001 | 5/1962 | Becke et al. ....................... | 260/78 L |
| 3,515,702 | 6/1970 | Raabe ............................... | 260/78 A |
| R27,939 | 3/1974 | Raabe ............................... | 260/78 L |

*Primary Examiner*—Lucille M. Phynes
*Attorney, Agent, or Firm*—Donald D. Jeffery

[57] ABSTRACT

The invention relates to copolyamides containing caprolactam, lauriclactam, hexamethylene diamine adipate and hexamethylene diamine salt of an aliphatic dicarboxylic acid with a carbon chain of 9, 10, 12 or 13 carbon atoms. The copolyamides are useful as heat-sealing agents.

12 Claims, No Drawings

COPOLYAMIDES CONTAINING CAPROLACTAM, LAURICLACTAM AND HEXAMETHYLENE DIAMINE ADIPATE

This invention relates to copolyamides containing caprolactam, lauriclactam and hexamethylene diamine adipate together with other polyamide-forming components as basic units, to a process for producing these copolyamides and to their use for heat-sealing.

BACKGROUND OF THE INVENTION

It is known that copolyamides containing from 80 to 20 percent by weight of the basic unit lauriclactam and, accordingly, 20 to 80 percent by weight of the basic units of one or more other polyamide-forming substances, can be used for the production of shaped articles of high bond strength at elevated temperature which are suitable for heat-sealing (DAS No. 1,253,449). It is particularly preferred to use for this purpose copolyamides of lauriclactam and, preferably, caprolactam and/or hexamethylene diamine adipate or hexamethylene diamine sebacate. These known copolyamides into which two or three polyamide-forming monomers are incorporated by condensation as basic units, are widely used in the garment industry for heat-sealing textiles, especially woven fabrics. Unfortunately, the copolyamides described in DAS. No. 1,253,449 have a relatively high melting point which is above about 110°C, with the result that they cannot be used for heat-sealing temperature-sensitive substrates such as leather, temperature-sensitive natural and/or synthetic woven fabrics, non-woven fabrics, felts, tufted fabrics and the like. Substances with melting temperatures of below about 115°C, if possible below 110°C or even below 105°C, are required for heat-sealing temperature-sensitive substrates of this kind.

SUMMARY OF THE INVENTION

The object of the invention is to find substances which are suitable for heat-sealing temperature-sensitive substrates, show a high bond strength at low sealing temperatures and after cooling and which nevertheless are highly resistant to chemical cleaning agents.

The present invention relates to copolyamides containing caprolactam, lauriclactam and hexamethylene diamine adipate as basic units, distinguished by the fact that they contain as an additional basic unit a hexamethylene diamine salt of an aliphatic dicarboxylic acid corresponding to the formula $$HOOC-(CH_2)_n-COOH$$

(I)

in which $n$ is the number 7, 8, 10 or 11, the basic units being incorporated into the copolymer in the following proportions:

| | |
|---|---|
| caprolactam | 25–35% by weight |
| lauriclactam | 20–40% by weight |
| hexamethylene diamine adipate | 8–25% by weight |
| hexamethylene diamine salt of the acid of formula (I) | 10–40% by weight |

The invention also relates to a process for the production of copolyamides containing caprolactam, lauriclactam and hexamethylene diamine adipate as basic units which is distinguished by the fact that the aforementioned basic units and, as an additional basic unit, a hexamethylene diamine salt of an aliphatic dicarboxylic acid corresponding to formula (I) are polymerised under pressure at elevated temperatures by methods known per se.

The copolyamides defined above are used for heat-sealing. The copolyamides according to the invention surprisingly show a very low melting point of below 110°C, extremely high bond strength at elevated temperature, so that they can be used with advantage for heat-sealing temperature-sensitive substrates, and a high resistance to chemical cleaning agents.

Copolyamides of the kind whose basic units are incorporated into the copolyamide by polymerisation in the following proportions are preferred for the purposes of the invention:

| | |
|---|---|
| caprolactam | 30% by weight |
| lauriclactam | 30–35% by weight |
| hexamethylene diamine adipate | 10–15% by weight |
| hexamethylene diamine salt of the acid of formula (I) | 15–35% by weight |

It is particularly preferred for the copolyamide to contain the hexamethylene diamine salt of the dicarboxylic acid of formula (I) in a quantity of from 20 to 30 percent by weight.

The acids of general formula (I) have the following names:
$n = 7$ azelaic acid
$n = 8$ sebacic acid
$n = 10$ dodecane dicarboxylic acid
$n = 11$ brassylic acid The acids of formula (I) in which $n$ stands for the number 7, 8 or 10 are particularly preferred for the purposes of the invention, acids in which $n$ is 7 or 8 being particularly preferred because they are readily available commercial products and lead to copolyamides which can be used with particular advantage for heat-sealing.

According to the invention, the copolyamides are produced by methods known per se. As in the production of C12-polyamide from lauriclactam, temperatures of from about 280° to 300°C, preferably a temperature of about 290°C, and pressures of from about 10 to 50 atms, preferably from about 15 to 30 atms, are generally used. Polymerisation is continued for several hours under these conditions. Polymerisation is preferably followed by after condensation for a few hours, preferably for about 1 to 3 hours, at a temperature of 250° to 300°C. The catalysts, chain terminators and/or other additives and the process conditions normally used for the polymerisation of lauriclactam are employed. The process is best carried out in the absence of air, i.e. in an inert gas atmosphere. The copolyamides according to the invention are preferably used for heat-sealing in the form of fine powders which are applied to the substrates to be bonded. A preferred viscosity for the copolyamide when it is used for the production of films is from about 1.4 to 1.5. This figure denotes the solution viscosity of a 0.5 percent solution of the copolyamide in m-cresol at 25°C.

The copolyamides used in accordance with the invention can contain other additives, for example dyes, in the usual way.

The copolyamides used in accordance with the invention are copolymers which are formed during the polymerisation of a mixture of the polyamide formers. The basic units are condensed into the polymer chain in statistical distribution. The surprising effects described are not obtained when the polyamide formers are polymerised separately from the mono polyamides and subsequently melted together with them.

The copolyamides according to the invention can also have small quantities of other polyamide formers condensed into them. However, for reasons of ready accessibility and satisfactory reproducibility of production to form copolyamides with uniform properties, it is generally not advisable to add further polyamide formers.

It is possible by means of the copolyamides according to the invention to bond substrates of many different kinds with particular advantage temperature-resistant substrates, to substrates of the same or different type. A copolyamide according to the invention is preferably introduced in the form of a powder between the surfaces to be bonded. The copolyamide can of course also be used in the form of films, filaments and chopped filaments. The substrates are then pressed with the polyamide according to the invention at elevated temperature. The pressing temperature is governed primarily by the temperature sensitivity of the substrate. Since the copolyamides according to the invention develop outstanding bond strength even at very low sealing temperatures of, for example, from about 100° to 130°C or up to 150°C, depending upon their melting range, it is possible to apply extremely low sealing temperatures. Cooling to room temperature is accompanied by hardening so that the bonded substrates are firmly united. There is no need for drying or evaporation of solvents.

The copolyamides according to the invention in the form of powders can be applied to a substrate to be bonded, for example by the powder coating machines normally used in the coating industry. In this connection, it is also possible to coat only selected areas of the substrate surface with the copolyamide powder according to the invention. Examples of substrates to be bonded include textiles of natural materials and/or synthetic materials such as wool, silk, cotton and polyesters, polyamides and the like. Other temperature-sensitive substrates such as leather, plastics films and the like, can also be heat sealed using the copolyamides according to the invention.

DESCRIPTION OF PREFERRED EMBODIMENTS

EXAMPLE 1

350 parts by weight of caprolactam, 150 parts by weight of adipic acid hexamethylene diamine salt, 350 parts by weight of lauriclactam, 150 parts by weight of azelaic acid hexamethylene diamine salt (6,9-salt), 12 parts by weight of adipic acid as polymerisation-degree regulator and 100 parts by weight of distilled water, are weighed into an autoclave equipped with stirring mechanism. The atmospheric oxygen inside the autoclave is removed by repeated rinsing under pressure with pure nitrogen. The reaction mixture is heated to 290°C and the pressure inside the autoclave limited to 25–30 atms by suitably adjusting the valve. The reaction mixture is exposed to the aforementioned pressure and temperature conditions for a period of 3 hours during which it is stirred. The pressure is then reduced to normal pressure over a period of 2 hours. The reaction mass is then aftercondensed while stirring for 2 hours in the absence of pressure under a gentle stream of nitrogen.

On completion of the pressure free aftercondensation phase, the temperature is reduced to 180°–200°C and the melt spun through a nozzle in the form of a monofil by means of a gear pump, cooled and granulated.

The resulting granulates have a melting range of 95° to 102°C, as measured on a KOFLER heating-stage microscope, and a relative solution viscosity of 1.45, as measured in a 0.5% solution in m-cresol at 25°C by means of an Ostwald viscosimeter.

The azelaic acid hexamethylene diamine salt used in this Example was prepared as follows from a commercial-grade azelaic acid known as EMEROX 1144;

1 mol (190.0 g) of EMEROX 1144 are dissolved under reflux in isopropanol, followed by the addition while stirring of 1.02 mol (118.5 g) of hexamethylene diamine, also dissolved in isopropanol. The white deposit formed is filtered off and dried. The resulting azelaic acid hexamethylene diamine salt (6,9-salt) melts at 150° to 152°C and has a pH-value of 7.6, as measured in a 1% aqueous solution.

EXAMPLE 2

300 parts by weight of caprolactam, 100 parts by weight of AH-salt, 300 parts by weight of lauriclactam, 300 parts by weight of azelaic acid hexamethylene diamine salt, 12 parts by weight of adipic acid as polymerisation-degree regulator and 100 parts by weight of distilled water, are reacted under the polycondensation conditions described in Example 1.

The product is a copolyamide melting at 90° to 95°C, as measured on a KOFLER heating-stage microscope.

EXAMPLE 3

A copolyamide at 85° to 90°C is prepared from the following components in the manner described in Example 1: 300 parts by weight of caprolactam, 150 parts by weight of AH-salt, 400 parts by weight of lauriclactam, 150 parts by weight of sebacic acid hexamethylene diamine salt (6,10-salt) and 12 parts by weight of adipic acid.

EXAMPLE 4

300 parts by weight of caprolactam, 150 parts by weight of AH-salt, 400 parts by weight of lauriclactam, 150 parts by weight of dodecane dicarboxylic acid hexamethylene diamine salt (6,12-salt), 12 parts by weight of adipic acid and 100 parts by weight of distilled water, are reacted under the polycondensation conditions described in Example 1.

A copolyamide melting at 95° to 102°C is obtained.

The 6,12-salt used is prepared from the commercially available component described in Example 1.

EXAMPLE 5

A copolyamide melting at 100° to 110°C is prepared from the following components under the polycondensation conditions described in Example 1: 300 parts by weight of caprolactam, 150 parts by weight of AH-salt, 350 parts by weight of lauriclactam, 135.5 parts by weight of brassylic acid ($C_{13}$-dicarboxylic acid), 64.5 parts by weight of hexamethylene diamine, 12 parts by weight of adipic acid.

EXAMPLES 6 to 15

Copolyamides were prepared from the starting components specified in Table 1 below in accordance with the procedure described in Example 1. The following abbreviations were used:

6 = caprolactam
12 = lauriclactam
6,6= AH-salt
6,9= hexamethylene diamine azelaic acid salt
6,10= hexamethylene diamine sebacic acid salt
6,12= hexamethylene diamine dodecane dicarboxylic acid salt
6,13= hexamethylene diamine brassylic acid salt The melting temperatures of the copolyamides obtained are also shown in Table 1.

In the individual Examples, the quantities in which the basic units are used can generally be changed by about ± 3 percent or at least by 1.5 percent without adversely affecting the properties of the copolyamides obtained to any appreciable extent.

The copolyamide has a melting temperature of from 110° to 120°C and a melt viscosity of 2,000 poises at 140°C.

The polyamides were each ground while cooling and separated by sifting into a fraction of 0 to 200 nm.

The two powder fractions were applied to a conventional interlining material in an 11-mesh pattern in a weight of $16 \pm 1$ g per $m^2$ by means of a powder pointing machine of the kind commonly used in the coating industry.

The coated interlinings thus obtained were ironed with a polyester/cotton fabric under a constant pressure of 350 p/cm² on an electrically heated ironing press of the kind commonly used in the garment industry, both the plate temperature and the contact time being varied.

Table 1

| Example | Monomer composition | | | | | | | Melting range °C |
|---|---|---|---|---|---|---|---|---|
| | % 6 | % 12 | % 6,6 | % 6,9 | % 6,10 | % 6,12 | % 6,13 | |
| 6 | 25 | 35 | 20 | 20 | — | — | — | 95 – 100 |
| 7 | 30 | 20 | 20 | 30 | — | — | — | 98 – 106 |
| 8 | 30 | 30 | 20 | 20 | — | — | — | 95 – 100 |
| 2 | 30 | 30 | 10 | 30 | — | — | — | 92 – 98 |
| 9 | 30 | 35 | 15 | 20 | — | — | — | 90 – 100 |
| 10 | 30 | 40 | 15 | 15 | — | — | — | 90 – 95 |
| 11 | 30 | 40 | 10 | 20 | — | — | — | 101 – 107 |
| 1 | 35 | 35 | 15 | 15 | — | — | — | 95 – 102 |
| 12 | 30 | 35 | 15 | — | 20 | — | — | 85 – 91 |
| 13 | 30 | 30 | 10 | — | 30 | — | — | 91 – 99 |
| 3 | 30 | 40 | 15 | — | 15 | — | — | 85 – 90 |
| 14 | 30 | 30 | 10 | — | — | 30 | — | 95 – 103 |
| 15 | 30 | 35 | 15 | — | — | 20 | — | 96 – 103 |
| 4 | 30 | 40 | 15 | — | — | 15 | — | 95 – 102 |
| 5 | 30 | 35 | 15 | — | — | — | 20 | 100 – 110 |

COMPARISON TEST

In this comparison test, the bond strength of a copolyamide according to the invention is compared with that of a copolyamide containing only the basic units caprolactam, lauriclactam and AH-salt.

The copolyamide of Example 13 which has a melt viscosity of 3000 poises at 140°C, is used as the copolyamide according to the invention.

A copolyamide of the following polyamide-forming basic units is used as the comparison copolyamide: 30 percent of caprolactam, 45 percent of lauriclactam and 25 percent of AH-salt.

The delamination strengths of 2.5 cm wide laminate strips were measured by means of a tension tester.

The delamination strengths (p/2.5 cm) specified in Table 2 were measured:

Table 2

| Contact time (seconds) | Plate temperature of the ironing press (°C) | | | | | |
|---|---|---|---|---|---|---|
| | 110 | 120 | 130 | 140 | 150 | |
| 6 | 400 | 700 | 600 | 800 | 900 | Invention |
| | — | — | 100 | 200 | 200 | Comparison |
| 10 | 500 | 900 | 900 | 900 | 1200 | Invention |
| | — | — | 200 | 300 | 400 | Comparison |
| 15 | 700 | 1100 | 1100 | 1200 | 1200 | Invention |
| | — | — | 300 | 400 | 700 | Comparison |
| 18 | 700 | 1200 | 1000 | 1100 | 1600 | Invention |
| | — | — | 350 | 500 | 800 | Comparison |

It can be seen from the Table that extremely good adhesion is obtained even at very low plate temperatures of the ironing press, i.e. at very low sealing temperatures of 110° and 120°C, whereas no adhesion is obtained with the conventional copolyamide at sealing temperatures as low as these. The conventional polyamide only produces firm adhesion at higher sealing temperatures.

What is claimed is:

1. A solid copolyamide consisting essentially of recurring units of caprolactam, lauriclactam, hexamethylene diamine adipate and a hexamethylene diamine salt of an aliphatic dicarboxylic acid of the formula $$HOOC-(CH_2)_n-COOH \quad (I)$$

in which $n$ is the number 7, 8, 10 or 11, said units being incorporated in the copolyamide by polymerisation in the following proportions:

| | |
|---|---|
| caprolactam | 25–35% by weight |
| lauriclactam | 20–40% by weight |
| hexamethylene diamine adipate | 8–25% by weight |
| hexamethylene diamine salt of the acid of formula (I) | 10–40% by weight. |

2. The copolyamide according to claim 1, wherein said units are incorporated in the copolyamide by polymerisation in the following proportions:

| | |
|---|---|
| caprolactam | about [~] 30% by weight |
| lauriclactam | 30–35% by weight |
| hexamethylene diamine adipate | 10–15% by weight |
| hexamethylene diamine salt of the acid of formula (I) | 15–35% by weight. |

3. The copolyamide according to claim 1, wherein the hexamethylene diamine salt of the dicarboxylic acid of formula (I) is incorporated in the copolyamide in a quantity of from 20 to 30 percent by weight.

4. The copolyamide according to claim 1, in which $n$ in formula (I) is 7, 8 or 10.

5. The copolyamide according to claim 4, wherein $n$ in formula (I) stands for the number 7 or 8.

6. A process for the production of powdery copolyamides consisting essentially of recurring units of caprolactam, lauriclactam, hexamethylene diamine adipate and a hexamethylene diamine salt of an aliphatic dicarboxylic acid corresponding to the formula $$HOOC-(CH_2)_n-COOH$$

in which $n$ is 7, 8, 10 or 11, comprising the step of polymerizing said units under pressure at elevated temperature in the following quantitative proportions:

| | |
|---|---|
| caprolactam | 25–35% by weight |
| lauriclactam | 20–40% by weight |
| hexamethylene diamine adipate | 8–25% by weight |
| hexamethylene diamine salt of the acid of formula (I) | 10–40% by weight. |

7. The process according to claim 6, in which the units are polymerised in the following quantitative proportions:

| | |
|---|---|
| caprolactam | about [~] 30% by weight |
| lauriclactam | 30–35% by weight |
| hexamethylene diamine adipate | 10–15% by weight |
| hexamethylene diamine salt of the acid of formula (I) | 15–35% by weight. |

8. The process according to claim 6, wherein the hexamethylene diamine salt of the dicarboxylic acid of formula (I) is incorporated in the polymerization step in a quantity of from 20 to 30 percent by weight.

9. The process according to claim 6, wherein $n$ in formula (I) is 7, 8 or 10.

10. The process according to claim 9, wherein $n$ in formula (I) is 7 or 8.

11. The process according to claim 6, wherein polymerisation is carried out at a temperature of from 280° to 300°C and under a pressure of 10 to 50 atms.

12. The process according to claim 6, wherein after-condensation is carried out for 1 to 3 hours at 250° to 300°C.

* * * * *